(12) United States Patent
Broitzman et al.

(10) Patent No.: US 8,664,891 B2
(45) Date of Patent: *Mar. 4, 2014

(54) LED WHITE-LIGHT DEVICES FOR DIRECT FORM, FIT, AND FUNCTION REPLACEMENT OF EXISTING LIGHTING DEVICES

(71) Applicant: Broit Light, L.L.C., Coral Gables, FL (US)

(72) Inventors: Troy R. Broitzman, Palm Bay, FL (US); Steven C. Furlong, Maple Grove, MN (US)

(73) Assignee: LED Bulb L.L.C., Bonita Springs, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/873,448

(22) Filed: Apr. 30, 2013

(65) Prior Publication Data

US 2013/0264944 A1 Oct. 10, 2013

Related U.S. Application Data

(63) Continuation of application No. 12/688,871, filed on Jan. 16, 2010, now Pat. No. 8,471,494.

(51) Int. Cl.
*H05B 37/02* (2006.01)
*F21V 29/00* (2006.01)

(52) U.S. Cl.
USPC ........... 315/294; 315/291; 315/307; 362/234; 362/246; 362/373

(58) Field of Classification Search
USPC ............ 315/185 R, 291, 294, 295, 307–309, 315/312; 362/234, 235, 241, 276, 294, 373
See application file for complete search history.

(56) References Cited

U.S. PATENT DOCUMENTS 8,471,494 B2 * 6/2013 Broitzman et al. ............ 315/294
2010/0264845 A1 * 10/2010 Broitzman .................... 315/294

* cited by examiner

*Primary Examiner* — Jimmy Vu
(74) *Attorney, Agent, or Firm* — Law Offices of Mark L. Berrier

(57) ABSTRACT

A white light LED-based lighting device configured for direct form, fit, and function replacement of existing incandescent and fluorescent devices is provided. The white light LED-based lighting device comprises a group of solid state light emitting diodes, electronics to activate the light emitting diodes, and an encapsulating housing configured for direct form, fit, and function replacement of existing devices.

14 Claims, 5 Drawing Sheets

LED WHITE-LIGHT DEVICES FOR DIRECT FORM, FIT, AND FUNCTION REPLACEMENT OF EXISTING LIGHTING DEVICES

CROSS-REFERENCE TO RELATED APPLICATIONS

This application is a continuation of U.S. patent application Ser. No. 12/688,871, filed Jan. 16, 2010, which claims the benefit of U.S. Provisional Patent Application 61/206,255, filed Jan. 29, 2009. All of the foregoing patent applications are incorporated by reference as if set forth herein in their entirety.

BACKGROUND

1. Field of the Invention

The present invention is directed generally to lighting devices, and more particularly to white light LED-based lighting devices configured for direct form, fit, and function replacement of existing fluorescent lighting devices. Related art.

2. Background

Energy conservation, in all its varied forms, has become a national priority of the United States as well as the rest of the world, from both the practical point of view of limited natural resources and recently as a security issue to reduce our dependence on foreign oil. A large proportion (some estimates are as high as one third) of the electricity used in residential homes in the United States each year goes to lighting. The percentage is much higher for businesses, streetlights, amongst other varied items. Accordingly, there is an ongoing need to provide lighting, which is more energy efficient. It is well known that both incandescent and fluorescent light bulbs are very energy inefficient light sources - - - in the case of incandescent light bulbs, about ninety percent of the electricity they consume is released as heat rather than light. This heat adds to the cooling load of a system during cooling season. In heating season the cost per BTU of heat that the lights give off is typically more expensive than the cost per BTU of the main heat source. The heat that is given off by the lighting also can cause "over shooting" of the desired temperature which waists energy and makes the space feel uncomfortable. Fluorescent light bulbs are more efficient than incandescent light bulbs (by a factor of about four) but are still quite inefficient as compared to solid-state light emitters, such as light emitting diodes (LED's).

In addition, as compared to the normal lifetimes of solid-state light emitters, incandescent light bulbs have relatively short lifetimes, i.e., typically in the range of 750 to 2000 hours. Fluorescent bulbs have longer lifetimes (e.g., 8,000 to 20,000 hours), but provide less favorable color reproduction. In dramatic comparison, the lifetime of light emitting diodes, for example, can generally be measured in decades (approximately 100,000 hrs or more).

One established method of comparing the output of different light generating sources has been coined color reproduction. Color reproduction is typically given numerical values using the so-called Color Rendering Index (CRI). CRI is a relative measurement of how the color rendition of an illumination system compares to that of a blackbody radiator, i.e., it is a relative measure of the shift in surface color of an object when lit by a particular lamp. The CRI equals 100 if a set of test colors being illuminated by an illumination system are the same as the results as being irradiated by a blackbody radiator. Daylight has the highest CRI (100), with incandescent bulbs being relatively close (about 95), and fluorescent lighting being less accurate (70 to 85). Certain types of specialized lighting have relatively low CRI's (e.g., mercury vapor or sodium, both as low as about 40 or even lower). Sodium lights are used, e.g., to light highways and surface streets. Driver response time, however, significantly decreases with lower CRI values (for any given brightness, legibility decreases with lower CRI).

A practical issue faced by conventional lighting systems is the need to periodically replace the lighting devices (e.g., light bulbs, etc.). Such issues are particularly pronounced where access is difficult (e.g., vaulted ceilings, bridges, high buildings, traffic tunnels) and/or where change-out costs are extremely high. The typical lifetime of conventional fixtures is about 20 years, corresponding to a light-producing device usage of at least about 44,000 hours (based on a typical usage of 6 hours per day for 20 years). In contrast light-producing device lifetimes are typically much shorter, thus creating the need for periodic change-outs. The potential number of residential homes that may be candidates for these periodic change-outs of the traditional incandescent lighting systems, including base fixtures and lamps themselves, may be extremely large and represent an attractive commercial enterprise. For example, in the United States alone new residential home construction has average approximately 1.5 million dwellings per year over the last 30 years running. Even neglecting older homes built before 1978, this represents at least 45 million residential dwellings that are candidates for potential upgrades to more energy efficient LED-based lighting systems.

Accordingly, for these and other reasons, efforts have been ongoing to develop ways by which solid-state light emitters can be used in place of incandescent lights, fluorescent lights and other light-generating devices in a wide variety of applications. In addition, where solid state light emitters are already being used, efforts are ongoing to provide solid state light emitter-containing devices which are improved energy efficiency, color rendering index (CRI), contrast, and useful lifetime.

Light emitting diodes are well-known semiconductor devices that convert electrical current into light. A wide variety of light emitting diodes are used in increasingly diverse fields for an ever-expanding range of purposes. More specifically, light emitting diodes are semiconducting devices that emit light (ultraviolet, visible, or infrared) when an electrical potential difference is applied across a p-n junction structure. There are a number of well-known ways to make light emitting diodes and many associated structures, and the present invention can employ any such manufacturing technique.

The commonly recognized and commercially available light emitting diodes that are sold, for example, in electronics stores typically represents a "packaged" device made up of a number of parts. These packaged devices typically include a semiconductor-based light emitting diode and a means to encapsulate the light emitting diode. As is well known, a light emitting diode produces light by exciting electrons across the band gap between a conduction band and a valence band of a semiconductor active (light-emitting) layer. The electron transition generates light at a wavelength that depends on the band-gap energy difference. Thus, the color of the light (usually expressed in terms of its wavelength) emitted by a light emitting diode depends on the semiconductor materials of the active layers of the light emitting diode.

Although the development of solid state light emitters, e.g., light emitting diodes, has in many ways revolutionized the lighting industry, some of the characteristics of solid state light emitters have presented challenges, some of which have not yet been fully met. For example, the emission spectrum of any particular light emitting diode is typically concentrated around a single wavelength (as dictated by the light emitting diode's composition and structure), which is desirable for some applications, but not desirable for others, e.g., for providing lighting, given that such an emission spectrum typically provides a very low CRI.

Because light that is perceived as white is necessarily a blend of light of two or more colors (or wavelengths), no single light emitting diode can produce white light. "White light" emitting devices have been produced which have a light emitting diode structure comprising individual red, green and blue light emitting diodes mounted on a common substrate. Other "white light" emitting devices have been produced which include a light emitting diode which generates blue light and a luminescent material (e.g., a phosphor) that emits yellow light in response to excitation by the blue LED output, whereby the blue and the yellow light, when appropriately mixed, produce light that is perceived as white light. A wide variety of luminescent materials are well known and available to persons of skill in the art. For example, a phosphor is a luminescent material that emits a responsive radiation (typically visible light) when excited by a source of exciting radiation. In many instances, the responsive radiation has a wavelength, which is different, typically longer, from the wavelength of the exciting radiation. Other examples of luminescent materials include day glow tapes and inks, which glow in the visible spectrum upon illumination with ultraviolet light. Luminescent materials can be categorized as being down-converting, i.e., a material which converts photons to a lower energy level (longer wavelength) or up-converting, i.e., a material which converts photons to a higher energy level (shorter wavelength). Inclusion of luminescent materials in LED devices has typically been accomplished by adding the luminescent materials to a clear plastic encapsulating material (e.g., epoxy-based or silicone-based material).

As noted above, "white LED lights" (i.e., lights which are perceived as being white or near-white) have been investigated as potential replacements for white light incandescent lamps. A representative example of a white LED lamp includes a package of a blue light emitting diode chip, made of gallium nitride (GaN), coated with a phosphor such as Yttrium Aluminum Garnet (YAG). In such an LED lamp, the blue light emitting diode chip produces a blue emission and the phosphor produces yellow fluorescence on adsorbing that emission. For instance, in some designs, white light emitting diodes are fabricated by forming a ceramic phosphor layer on the output surface of a blue light-emitting semiconductor light emitting diode. Part of the blue rays emitted from the light emitting diode pass through the phosphor, while part of the blue rays emitted from the light emitting diode chip are absorbed by the phosphor, which becomes excited and emits a yellow ray. The part of the blue light emitted by the light emitting diode, which is transmitted through the phosphor, is mixed with the yellow light emitted by the phosphor. The viewer perceives the mixture of blue and yellow light as white light.

In another type of LED lamp, a light emitting diode chip that emits an ultraviolet ray is combined with phosphor materials that produce red (R), green (G) and blue (B) light rays. In such an "RGB LED lamp", the ultraviolet rays that have been radiated from the light emitting diode excites the phosphor, causing the phosphor to emit red, green and blue light rays which, when mixed, are perceived by the human eye as white light. Consequently, white light can also be obtained as a mixture of these light rays.

In yet another type of LED lamp, a light emitting diode chip that emits a blue ray is combined with a phosphor material that produces both a green (G) and a red (R) ray. In such an "RGB LED lamp", the blue rays that have been partially absorbed by the phosphor, excites the phosphor, causing the phosphor to emit green and red light rays, which, when mixed with the unabsorbed blue rays, are perceived by the human eye as white light. Consequently, white light can also be obtained as a mixture of these light rays.

Designs have been realized in which existing LED's and other electronics are assembled into an integrated housing fixture. In such designs, an LED or plurality of LED's are mounted on a circuit board encapsulated within the housing fixture, and a heat sink is typically mounted to the exterior surface of housing fixture to dissipate heat generated from within the device, the heat being generated by inefficient AC-to DC conversion from with the device. Although devices of this type can generate white light by any of the means described above, their external geometry does not permit direct form, fit, and function replacement of existing incandescent lighting systems currently installed in residential homes. For example, one such prior art device is described in the LED Lighting Fixtures Inc. catalog as part number LR6. The LR6 embodiment includes an encapsulated LED structure with an external heat sink assembly integrated as part of a thermal management system. The necessity of an external heat sink assembly in conjunction with an integrated thermal management system adds significant cost to the device as compared to equivalent light output off-the-shelf incandescent devices. In addition, the incorporation of the external heat sink assembly adds significant weight to the device as well as yields an overall external geometry to the lamp which is cylindrical in nature, not at all similar to the familiar incandescent lamps, which in itself may be an impediment to market acceptance to the average home owner envisioning a direct form, fit, and function swap-out.

Given this, there is a need for a "white light" Led device capable of direct form, fit, and function replacement of existing fluorescent devices, which can be installed directly by the homeowner without the need of unwanted masonry work and without the additional cost of a licensed technician to perform such an installation.

SUMMARY OF THE INVENTION

Generally, the present invention is directed to lighting devices, and more particularly to white light LED-based lighting devices configured for direct form, fit, and function replacement of existing fluorescent devices.

One embodiment of the present invention describes a lighting device for generating diffuse white light comprising a group of solid state light emitters, electronics to activate the solid state light emitters by converting 120 volt 60 cycles per second alternating current to a steady state voltage, direct current, and an encapsulating housing enclosing the solid state light emitters and the activating electronics with a shape and form factor substantially equivalent to the American National Standards Institute (ANSI) T5, T6, T8, T9, T12, Circline (T6, T9) U-Bent (T8, T12), Quad-Tube, or Spiral lighting device structure.

The above summary of the present invention is not intended to describe each illustrated embodiment or every implementation of the present invention. The figures and the detailed description, which follow more particularly, exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
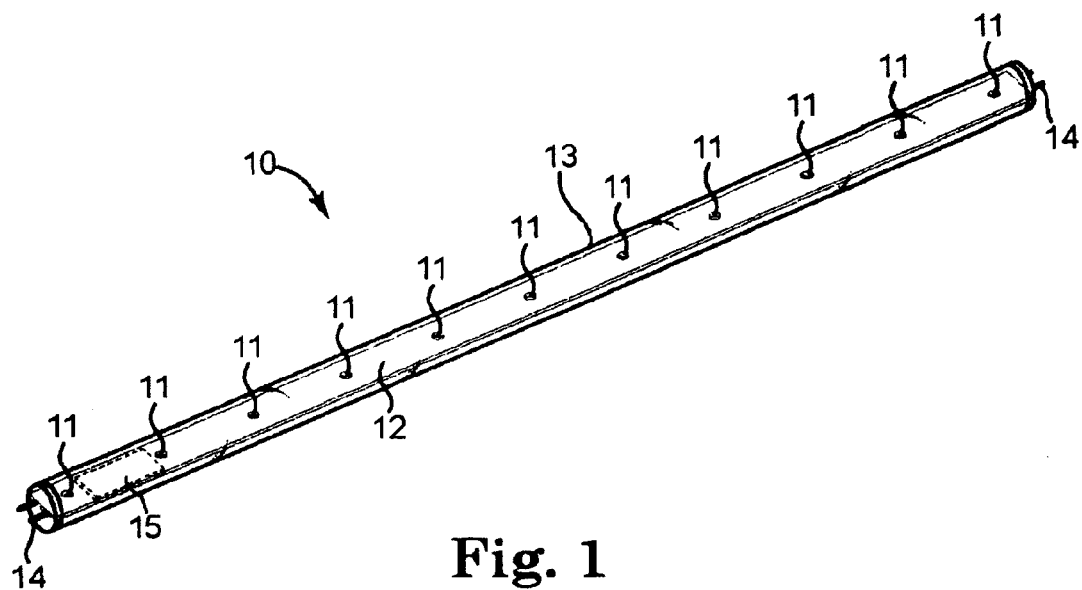
FIG. 1 shows a schematic representation of one embodiment of the present invention depicting a white light LED device configured for direct form, fit, and function replacement of existing fluorescent devices categorized by the American National Standards Institute (ANSI) as having part numbers T5, T8, and T12.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF EXEMPLARY EMBODIMENTS

In general, the present invention is directed to lighting systems, and more particularly to LED-based white light devices configured for direct form, fit, and function replacement of existing fluorescent lighting devices. In the context of the present invention the term "form" refers to the external geometrical shape of the devices and "fit" refers to the interface between the devices and external structures such as light bulb sockets. The term "function" is defined herein as referring to both the color of the devices light output (commonly referred to as its color temperature, which is a measure of the peak wavelength of light emitted by the device) and the total optical luminous flux emitted by the device commonly measured in units of lumens. In accordance with the present invention, an LED-based white device would be a direct replacement to its fluorescent counterpart under the conditions that:

1) The LED-based white light device has substantially the same external geometrical shape as its fluorescent counterpart;
2) The LED-based white light device would mount directly into the fluorescent light bulb's socket with no modifications necessary thereto;
3) The LED-based white light device would have a color temperature substantially equivalent to its fluorescent counterpart, and
4) The LED-based white light device would have an optical luminous flux (measured in lumens) substantially equivalent to its fluorescent counterpart.

One embodiment of a white light LED device 10 in accordance with the present invention is depicted schematically in FIG. 1. Fluorescent light bulb devices with the shape and form factor depicted in FIG. 1 have generally been categorized by the American National Standards Institute (ANSI) as having part numbers T5, T6, T8, T9, or T12, the difference being their diameter, increasing with higher numerical designation. FIG. 1 of the present invention is intended to represent the entire family of fluorescent light bulbs with the "T" designation including, but not limited to, those having part numbers T5, T8, or T12.

As shown in FIG. 1, a plurality of light emitting diodes 11 may be securely mounted to a substrate 12 within encapsulating housing 13. The substrate 12 may be comprised of a metal or composite material and function as a heat sink to dissipate thermal energy generated by the light emitting diodes 11. Encapsulating housing 13 may be comprised of a glass, ceramic, plastic or polymer-based material and may also include a reflective material on a portion of its' inboard surface. Encapsulating housing 13 may also have a portion of its' inboard or outer surface treated by any of a number of techniques (e.g., sand blasting) which give it a diffusing property such that the light emanating from the white light LED device 10 appears uniformly distributed over the surface with no apparent bright spots.

Encapsulating housing 13 may also include air vents and heat-sinking components to conduct or transfer outwardly heat generated from within the white light LED device 10. Encapsulating housing 13 may also include the necessary electronic components (not shown in FIG. 1) to convert a standard 120 volt AC (60 Hertz) signal to a direct current (DC) voltage appropriate for direct current driven LED's 11 mounted on substrate 12.

To generate white light, substrate material 12 may have individual red, green, and blue DC driven LEDs 11 mounted in sufficiently close proximity such that their respective light outputs are spatially mixed and appear as white light emanating from the white light LED device 10. The encapsulating housing 13 may also include the appropriate electronic components to alter the luminous flux output of the LED's 11 (commonly measured in units of lumens) and also modify the so-called color temperature of the white light LED device 10. The color temperature, commonly stated in units of degrees Kelvin, is a measure of the peak wavelength of light emitted from a radiating body. It is commonplace in the light bulb industry to refer to incandescent white light devices that have a color temperature in the range of 2800 to 3200 degrees Kelvin as being a "warm" color, whereas fluorescent lighting devices which typically have a color temperature in the range of 5800 to 6200 degrees Kelvin are referred to as being a "cool" color.

The encapsulating housing 13 may also include the appropriate electronic components to alter the color temperature of white light LED device 10 by varying the ratio of the steady state direct current (DC) voltages to the individual red, green, and blue light emitting diodes. For example, to generate a more "warm" color in the range of 2800 to 3200 degrees Kelvin, the electronic components may be chosen to deliver slightly more current to the red LED than to either the blue or green LED's. Similarly, to generate a more "cool" color similar to a compact fluorescent bulb, the electronic components may be chosen to deliver slightly more current to the blue LED than to either the green of red LED. In one embodiment of the present invention, the electronic components within encapsulating housing 13 may be configured to receive a remote command via a wireless RF link or equivalent means, to alter the current to the individual red, green, and blue LED's. Given this, both the luminous flux output (measured in Lumens) of the white light LED device 10 and the color temperature of the white light LED device 10 may be modified via remote control by varying the amplitude and ratio of the currents to the individual red, green, and blue LED's.

Alternatively, the white light LED device 10 may have one or more light emitting diodes 11 that emit blue light, which when partially absorbed by a phosphor material may produce both a green (G) and red (R) phosphorescence. In such an "RGB LED lamp", the red, green and blue light rays which, when mixed, are perceived by the human eye as white light.

In an alternative embodiment of the present invention, mounting pins 14 may be configured to supply a direct current (DC) voltage to white light LED device 10. In this configuration, the electronics 15 within encapsulating housing 13 may be configured as a DC-to-DC converter to apply the appropriate DC voltage(s) and drive currents to the DC driven LEDs 11 mounted therein.

In another embodiment of the present invention, the LED devices 11 may be compatible with an alternating current (AC) drive voltage. In this configuration, the white light LED device 10 may be configured to accept a 120 volt AC (60 Hertz) input signal and convert that signal to an AC signal appropriate for the individual LEDs mounted thereon. The electronics to activate the solid state light emitters may be configured as an AC-to-AC converter to appropriate AC voltage(s) and drive currents to the AC driven LEDs. Alternatively, the electronics to activate the solid-state light emitters may be configured as a AC-to-DC converter.

In yet another embodiment of the present invention, the LED devices 11 may be a mixture of some LEDs compatible with a direct current (DC) drive voltage and other LED devices designed to be driven by an alternating current (AC) drive voltage. In this configuration, the electronics within encapsulating housing 13 may be configured to supply both the appropriate AC and DC drive voltages to the respective AC and DC LED devices.

Figure 2:
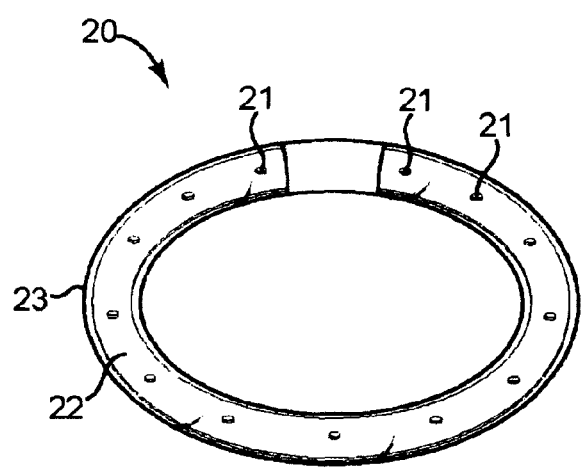
FIG. 2 shows a schematic representation of one embodiment of the present invention depicting a white light LED device configured for direct form, fit, and function replacement of existing fluorescent devices categorized by the American National Standards Institute (ANSI) as having part numbers T6 and T9.

Another embodiment of a white light LED device 20 in accordance with the present invention is depicted schematically in FIG. 2. Fluorescent light bulb devices with the shape and form factor depicted in FIG. 2 have generally been referred to as "Circline" and categorized by the American National Standards Institute (ANSI) as having part numbers T6HPF, T6NPF T9HPF, or T9N, the difference being their wattage rating, increasing with higher numerical designation. FIG. 2 of the present invention is intended to represent the entire family of Circline fluorescent light bulbs with the "T" designation including, but not limited to, those having part numbers with prefix T6 or T9.

As shown in FIG. 2, a plurality of light emitting diodes 21 may be securely mounted to a substrate 22 within encapsulating housing 23. The substrate 12 may be comprised of a metal or composite material and function as a heat sink to dissipate thermal energy generated by the light emitting diodes 21. Encapsulating housing 23 may be comprised of a glass, ceramic, plastic or polymer-based material and may also include a reflective material on a portion of its' inboard surface. Encapsulating housing 23 may also have a portion of its' inboard or outer surface treated by any of a number of techniques (e.g., sand blasting) which give it a diffusing property such that the light emanating from the white light LED device 20 appears uniformly distributed over the surface with no apparent bright spots.

Figure 3:
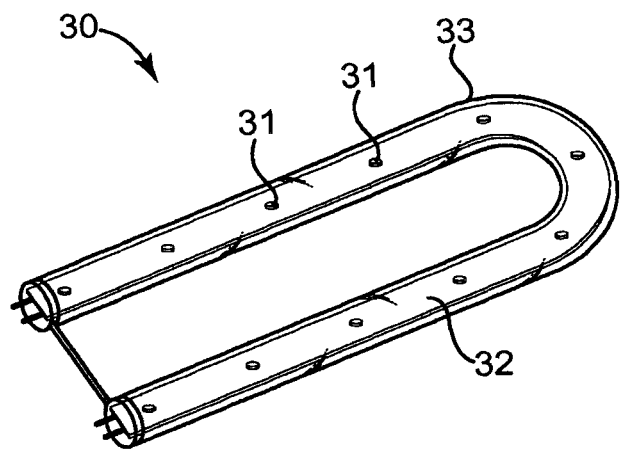
FIG. 3 shows a schematic representation of one embodiment of the present invention depicting a white light LED device configured for direct form, fit, and function replacement of existing fluorescent devices commonly referred to as U-Bent fluorescent tubes.

Another embodiment of a white light LED device 30 in accordance with the present invention is depicted schematically in FIG. 3. Fluorescent light bulb devices with the shape and form factor depicted in FIG. 3 have generally been referred to as "U-Bent" and categorized by the American National Standards Institute (ANSI) as having part numbers with a prefix FBO. FIG. 3 of the present invention is intended to represent the entire family of U-Bent fluorescent light bulbs with the "FBO" designation.

As shown in FIG. 3, a plurality of light emitting diodes 31 may be securely mounted to a substrate 32 within encapsulating housing 33. The substrate 12 may be comprised of a metal or composite material and function as a heat sink to dissipate thermal energy generated by the light emitting diodes 31. Encapsulating housing 33 may be comprised of a glass, ceramic, plastic or polymer-based material and may also include a reflective material on a portion of its' inboard surface. Encapsulating housing 33 may also have a portion of its' inboard or outer surface treated by any of a number of techniques (e.g., sand blasting) which give it a diffusing property such that the light emanating from the white light LED device 30 appears uniformly distributed over the surface with no apparent bright spots.

Figure 4:
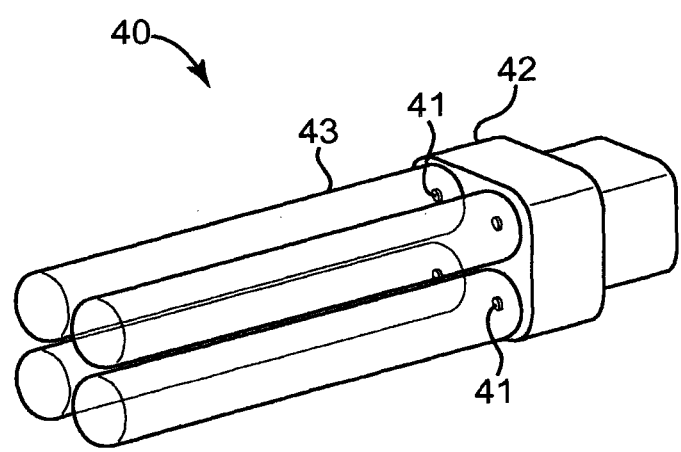
FIG. 4 shows a schematic representation of one embodiment of the present invention depicting a white light LED device configured for direct form, fit, and function replacement of existing fluorescent devices commonly referred to as Circline fluorescent tubes.

Another embodiment of a white light LED device 40 in accordance with the present invention is depicted schematically in FIG. 4. Fluorescent light bulb devices with the shape and form factor depicted in FIG. 4 have generally been referred to as "Quad-Tube". FIG. 4 of the present invention is intended to represent the entire family of Quad-Tube fluorescent light bulbs.

As shown in FIG. 4, a plurality of light emitting diodes 31 may be securely mounted to a substrate 32 within encapsulating housing 33. The substrate 42 may be comprised of a metal or composite material and function as a heat sink to dissipate thermal energy generated by the light emitting diodes 41. Encapsulating housing 43 may be comprised of a glass, ceramic, plastic or polymer-based material and may also include a reflective material on a portion of its' inboard surface. Encapsulating housing 43 may also have a portion of its' inboard or outer surface treated by any of a number of techniques (e.g., sand blasting) which give it a diffusing property such that the light emanating from the white light LED device 40 appears uniformly distributed over the surface with no apparent bright spots.

Figure 5:
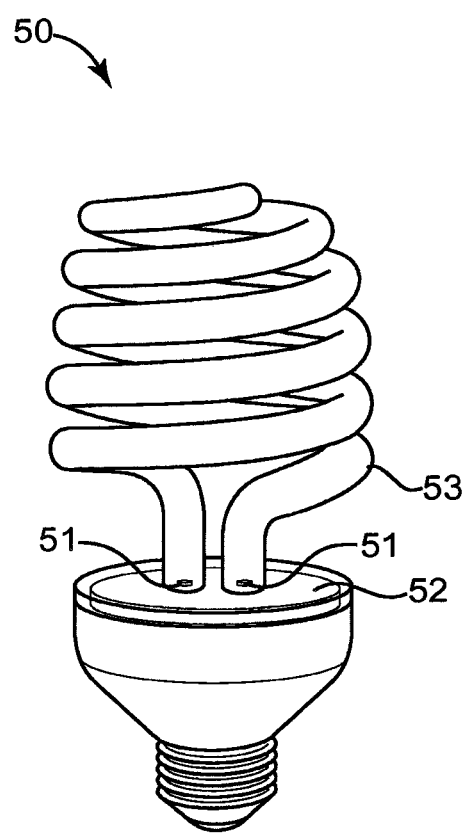
FIG. 5 shows a schematic representation of one embodiment of the present invention depicting a white light LED device configured for direct form, fit, and function replacement of existing incandescent devices commonly referred to as Spiral fluorescent tubes.

Another embodiment of a white light LED device 50 in accordance with the present invention is depicted schematically in FIG. 5. Fluorescent light bulb devices with the shape and form factor depicted in FIG. 4 have generally been referred to as "Spiral". FIG. 5 of the present invention is intended to represent the entire family of Spiral fluorescent light bulbs.

As shown in FIG. 5, a plurality of light emitting diodes 51 may be securely mounted to a substrate 52 within encapsulating housing 53. The substrate 52 may be comprised of a metal or composite material and function as a heat sink to dissipate thermal energy generated by the light emitting diodes 51. Encapsulating housing 53 may be comprised of a glass, ceramic, plastic or polymer-based material and may also include a reflective material on a portion of its' inboard surface. Encapsulating housing 53 may also have a portion of its' inboard or outer surface treated by any of a number of techniques (e.g., sand blasting) which give it a diffusing property such that the light emanating from the white light LED device 50 appears uniformly distributed over the surface with no apparent bright spots.

Figure 6:
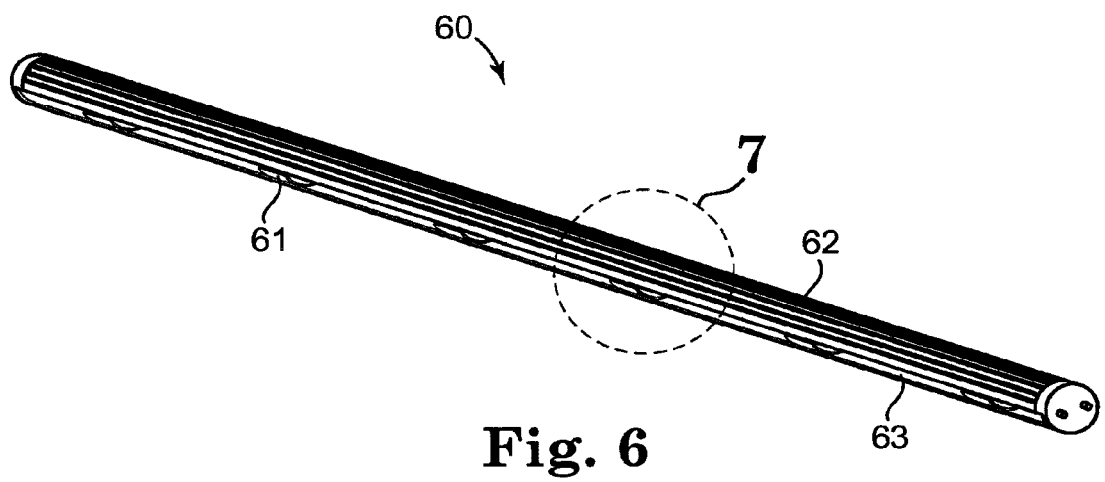
FIG. 6 shows a schematic representation of one embodiment of the present invention depicting a white light LED device configured with the LED's facing downward and having thermally conductive ribs extending along the longitudinal length of the white light LED device.

Another embodiment of a white light LED device 60 is accordance with the present invention is depicted schematically in FIG. 6. FIG. 6 is similar to FIG. 1, however showing the device 60 orientate with the LED's facing downward and highlighting thermally conductive rib(s) 62 extending along the longitudinal length of the white light LED device 60. Plastic surface 63 is shown extending along with longitudinal length of the LED device 60 and situated directly over LED's 61. The configuration depicted in FIG. 6 may be applicable for ceiling mounting of the white light LED device 60.

Figure 7:
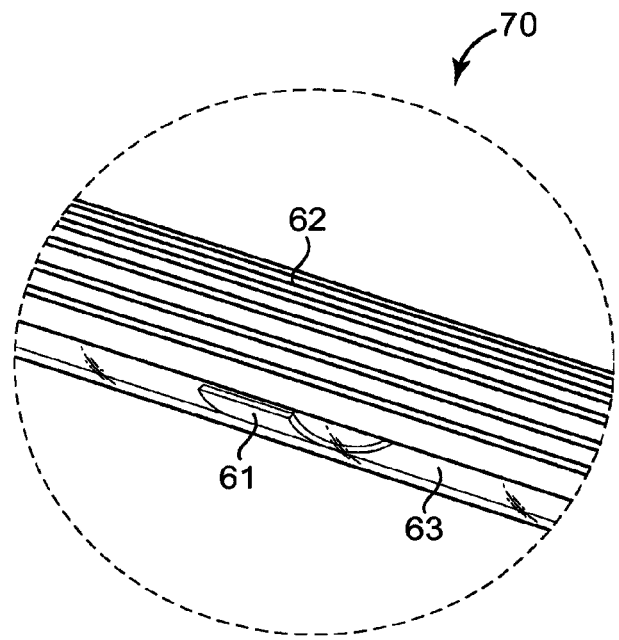
FIG. 7 shows a schematic representation of one embodiment of the present invention depicting a white light LED device having a transparent material surface directly over the LED's and the thermally conductive ribs extending along the longitudinal length of the white light LED device.

FIG. 7 is an enlarged view of region 70 of the white light LED device 60 highlighting the transparent material surface 63 directly over LED 61 and the plurality of thermally conductive rib(s) 62 extending along the longitudinal length of the white light LED device 60.

Figure 8:
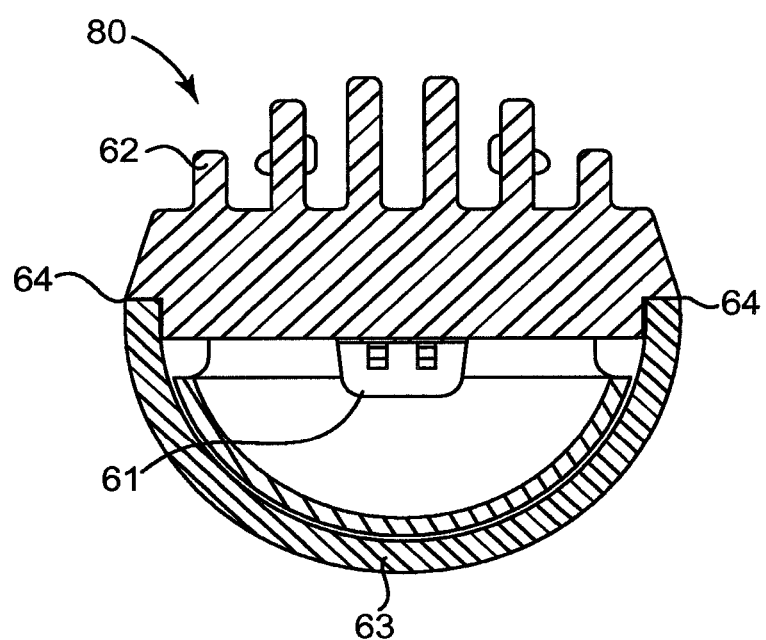
FIG. 8 shows a cross-sectional view of one embodiment of a white light LED device.

FIG. 8 shows a cross-sectional view 80 of the white light LED device 60 in a region highlighting a preferred embodiment of the present invention. As shown in FIG. 8, LED 61 may be in direct mechanical contact with the inboard surface of the thermally conductive rib(s) 62 there by decreasing the thermal resistance for heat emanating from LED 61 enroute to exiting the device 60. Thermally conductive rib(s) 62 may be comprised of a metal, metal alloy and or any other thermally conductive material chosen for its thermal resistance characteristics. Also, the height-to-width ratio of the thermally conductive rib(s) 62 may be chosen to optimize the overall surface are of the rib(s) 62 to increase its thermal transfer coefficient. FIG. 8 also shows hemispherical plastic and or other material surface 63 mating with the outer surface of the rib(s) 62 at locations 64 forming a watertight seal by techniques well know to those skilled in the art.

The present invention contemplates modifications to the above configuration depicted in FIGS. 1 thru 5 including, but not limited to:
1) The heat sinking substrate material described above may be a thermo-electric cooling device.
2) A diffusing element may be attached directly to the light emitting diodes.
3) The diffusing element attached directly to the light emitting diodes may be a lens.
4) The diffusing element attached directly to the light emitting diodes may be a lens with a negative focal length.
5) The diffusing element attached directly to the light emitting diodes may be comprised of an opal-like material.
6) The voltages and pin configurations described above may be modified on a country-by-country basis to adapt to international standards to achieve direct form, fit, and function replacement on a worldwide basis.

The present invention should not be considered limited to the particular examples described above, but rather should be understood to cover all aspects of the invention as fairly set out in the attached claims. Various modifications to the shape and form factors described above, equivalent processes to supplying the appropriate drive voltages to the LEDs, as well as numerous structures to which the present invention may be applicable will be readily apparent to those of skill in the art to which the present invention is directed upon review of the present specification. The following claims are intended to cover such modifications and devices.

What is claimed is:

1. A lighting device for generating diffuse white light comprising:
    a group of solid-state light emitters, said group including light emitting diodes energized by a direct current (DC) voltage, or an alternating current (AC) voltage or a combination of both AC and DC voltage;
    electronics to activate the solid state light emitters, wherein the electronics converts 120 volt 60 cycles per second alternating current to a steady state direct current (DC) voltage; and
    electronics to activate the solid state light emitters, wherein the electronics converts 240 volt 50 cycles per second alternating current to a steady state direct current (DC) voltage; and
    electronics to activate the solid state light emitters, wherein the electronics are configured as an AC-to-AC converter to appropriate AC voltage(s) and drive currents to the AC driven LEDs: and
    a second channel of the electronics to activate the solid-state light emitters, wherein said second channel of the electronics are configured as an AC-to-DC converter to apply the appropriate DC voltage (s) and drive currents to the DC driven LEDs; and
    a housing configured to supply an AC input signal and DC input signal to a base of the lighting device; and
    an encapsulating housing enclosing the solid-state light emitters and the activating electronics with a shape and form factor substantially equivalent to one of a plurality of American National Standards Institute lighting device structures.

2. The device of claim 1 wherein the group of solid-state emitters comprises a red, green, and blue light emitting diode capable of producing diffuse white light with a color temperature in a range of 2800 to 3200 degrees Kelvin and a luminous flux greater than 3000 lumens.

3. The device of claim 1 wherein the group of solid state emitters comprises a red, green, and blue light emitting diode capable of producing diffuse white light with a color temperature in a range of 5800 to 6200 degrees Kelvin and a luminous flux greater than 3000 lumens.

4. The device of claim 2 wherein the diffuse white light color temperature and luminous flux is modified by varying the ratio of the steady state direct current (DC) voltages and alternating current (AC) voltages to the individual red, green and blue light emitting diodes.

5. The device of claim 4 wherein the diffuse white light color temperature and luminous flux is continuously modified by remote control.

6. The device of claim 1 wherein the encapsulating housing includes a diffusing element on a lateral surface of the encapsulating housing.

7. The device of claim 1 wherein the encapsulating housing includes a reflective element on an inboard surface of the encapsulating housing excluding a bottom face.

8. The device of claim 1 wherein the encapsulating housing includes air vents.

9. The device of claim 1 wherein the encapsulating housing is in mechanical contact with a heat-sinking element.

10. The device of claim 1 wherein the group of solid-state emitters produce a diffuse white light via any color combination or means necessary with a color temperature between 1,000 and 10,000 degrees Kelvin and produce a luminous flux substantially equivalent to or greater than a replaced lighting device.

11. The device in claim 1 wherein part of the encapsulating housing comprises a heat conducting element.

12. The device in claim 11 wherein the heat conducting element is a metal, metal alloy and or any other heat conducting material.

13. The device in claim 11 wherein the heat conducting element is thermally conductive material with a rib(s) extending at least a portion of the longitudinal length of the lighting device.

14. The device in claim 11 wherein an outer surface of the heat conducting element is adhered to a portion of the encapsulating housing made of plastic so as to form a watertight seal.

* * * * *